United States Patent

Koizumi et al.

[11] Patent Number: 5,854,328
[45] Date of Patent: Dec. 29, 1998

[54] POLYOLEFIN ELASTOMER COMPOSITION

[75] Inventors: Junji Koizumi, Nagoya; Haruyasu Mizutani, Aichi-ken; Yoshiaki Shichida, Ichinomiya, all of Japan

[73] Assignee: Toyoda Gosei Co., Ltd., Aichi-ken, Japan

[21] Appl. No.: 686,050

[22] Filed: Jul. 22, 1996

[30] Foreign Application Priority Data

Jul. 21, 1995 [JP] Japan .................................. 7-185973
Oct. 23, 1995 [JP] Japan .................................. 7-274403

[51] Int. Cl.⁶ ...................................................... C08K 3/34
[52] U.S. Cl. ......................... 524/451; 525/240; 525/241; 264/331.17
[58] Field of Search ............................ 524/451; 525/240, 525/241; 264/331.17

[56] References Cited

U.S. PATENT DOCUMENTS 5,302,653  4/1994  Nishio et al. ............................ 525/240
5,439,628  8/1995  Huang ...................................... 525/240

FOREIGN PATENT DOCUMENTS 5-98097  4/1993  Japan .
5-98098  4/1993  Japan .
5-98099  4/1993  Japan .

*Primary Examiner*—Melvyn I. Marquis
*Attorney, Agent, or Firm*—Pillsbury Madison & Sutro LLP

[57] ABSTRACT

A composition for making an elongated molded product which can be satisfactorily used without having to be painted. The composition comprises an elastomer comprising crystalline polypropylene and ethylene-α-olefin rubber (EOR), and 0 to 15 phr of talc. The polypropylene (PP) and EOR have a blending ratio (PP/EOR) by weight of 35/65 to 67/33. The polypropylene has a Q value $(M_w/M_n) \geq 10$ and a melt flow rate of 50 to 120. The EOR has an α-olefin content of 10 to 20% by weight. The proportion Y of talc and the proportion X of the EOR in the elastomer satisfy the relation:

$Y \geq -0.63X + 34$.

18 Claims, 1 Drawing Sheet

POLYOLEFIN ELASTOMER COMPOSITION

BACKGROUND OF THE INVENTION

1. Field of the Invention

This invention relates to a composition comprising a polyolefin elastomer and, preferably, talc. More particularly, it relates to (i) a composition for making a paintless elongated molding which is dimensionally stable over widely varying temperatures and also has scratch resistance, and (ii) a composition for making a painted elongated injection molding having dimensional stability, moldability, and paintability.

2. Description of Related Art

It is known to form molded articles such as, for example, a side molding for an automobile from a polyolefin elastomer (TPO) composition. TPO compositions typically comprise the basic ingredients polypropylene and ethylene propylene rubber. TPO is a thermoplastic elastomer material which does not require vulcanization, recycles easily, and has excellent weatherability. It has been customary to paint side moldings formed from the TPO composition to improve scratch resistance. The painting of a side molding, however, adds to manufacturing cost and makes recycling difficult. Accordingly, there has been a long felt need for a side molding composition which does not have to be painted.

Previous attempts have been made to use a TPO composition having a higher polypropylene (PP) or talc content to make a side molding having higher surface hardness and thereby improved scratch resistance. Such attempts are disclosed in, for example, Japanese Patent Laid-Open Publication No. Sho 63-338. The side molding as injection molded from such a composition has, however, been found to be fraught with problems including (1) a higher coefficient of linear thermal expansion compared to the metallic material forming an automobile body, and (2) a higher flexural modulus (or rigidity) making it difficult to adapt the molding to a curved surface of an automobile body. Thus, it has been heretofore difficult to make, for example, a side molding which does not have to be painted but yet is satisfactorily high in scratch resistance and satisfactorily low in coefficient of linear thermal expansion and flexural modulus.

Similar problems are encountered in connection with a painted elongated molding such as a painted side molding. It has been customary to use a TPO composition containing as much as about 70 wt. % of a hard-phase component such as crystalline polypropylene for making an injection molded product for a painted side molding. The molded product should be satisfactory in mold releasability and outward appearance (see e.g. Japanese Patent Laid-Open publications No. Hei 5-98097, 5-98098 or 5-98099). Side moldings formed from such a composition, however, are generally so high in rigidity with a flexural modulus of at least 1200 MPa and a flexural strength of at least 20 MPa that they fail to adapt themselves to the curved bodies of recently popular streamlined automobiles. Failure of the side molding to fit the curved body usually necessitates undesirable use of a doublesided adhesive tape having a large effective area.

Therefore, attempts have been made to use a TPO composition containing a higher proportion of a soft-phase component, such as ethylene propylene rubber, and having a relatively low rigidity with a flexural modulus not exceeding 1000 MPa. However, the obtained molded product is often unsatisfactory in mold releasability or outward appearance. Thus, it has hitherto been difficult to make an injection molded product for a painted elongated molding which has a good balance among flexural modulus, mold releasability, outward appearance, and paintability.

Japanese Patent Publication No. Hei 6-43532 discloses a TPO composition for making an elongated molded product having an improved scratch resistance so that painting is unnecessary. The composition, however, contains an essential polyorganosiloxane component, and is believed to be more expensive than the compositions of the present inventions.

SUMMARY OF THE INVENTION

It is a first object of this invention to provide a polyolefin elastomer composition which can be formed into an elongated molded product having a good balance between the coefficient of linear thermal expansion, flexural modulus, and scratch resistance and without having to be painted. A good outward appearance is also important.

This object is attained by a composition which comprises as a base polymer mixture an elastomer comprising crystalline polypropylene (PP) and ethylene-α-olefin rubber (EOR). The composition further contains 0 to 15 phr of talc. The polypropylene and rubber have a blending ratio (PP/EOR) by weight of 35/65 to 67/33, and the polypropylene has a Q value $(M_w/M_n) \geq 10$, a melt flow rate (MFR) of 50 to 120, and an ethylene content not exceeding 10% by weight. The proportion Y (parts by weight) of talc and the proportion X (parts by weight) of rubber in the elastomer satisfy the relationship:

$$Y \geq -0.63X + 34.$$

This composition is hereinafter referred to as the first invention.

The Q value $(M_w/M_n)$ of the polypropylene means the ratio between weight-average molecular weight $(M_w)$ and number-average molecular weight $(M_n)$ as determined by gel permeation chromatography (GPC) and known to those skilled in the art. Melt flow rate (MFR) means the quantity in grams of material extruded in 10 minutes through an orifice having a diameter of 2.1 mm and a length of 8 mm when subjected to a force of 2.16 kgf at a temperature of 230° C. (or 190° C. in the case of the EOR).

It is a second object of this invention to provide an elongated injection molded product having a good balance among the coefficient of linear thermal expansion, flexural modulus, scratch resistance, and not having to be painted. A good outward appearance is also important.

This object is attained by a product which is injection molded from the composition according to the first invention and having an embossed ornamental surface thereon. This product is referred to hereinafter as the second invention.

It is a third object of this invention to provide a polyolefin elastomer composition which can be formed into an elongated injection molded and painted product which has a good balance among flexural modulus, mold releasability, outward appearance, and paintability. A low coefficient of linear thermal expansion is also important.

This object is attained by a composition used for making an elongated injection molded and painted product having a flexural modulus not exceeding 1000 MPa. The composition comprises as a base polymer mixture an elastomer which comprises crystalline polypropylene as a hard-phase component. Ethylene propylene rubber (EPR) and ethylene α-olefin rubber are included in the composition as soft components. The α-olefin has 4 to 12 carbon atoms, and the α-olefin rubber is called a limited EOR. The hard- and soft-phase components have a ratio (hard/soft) by weight of 48/52 to 67/33. The EPR and limited EOR have a ratio (EPR/EOR) by weight of 1/9 to 9/1. The polypropylene has a Q value $(M_w/M_n) \geq 10$ and a melt flow rate of 50 to 120. The EPR has a Mooney viscosity of 3 to 35 $(ML_{1+4}, 100°C.)$. The limited EOR has a specific gravity not exceeding 0.892. This composition is referred to hereinafter as the third invention.

It is a fourth object of this invention to provide an elongated injection molded product for a painted article which has a good balance between flexural modulus, mold releasability, outward appearance, and paintability. A low coefficient of linear thermal expansion is also important.

This object is attained by a product molded from the composition according to the third invention and having a painted ornamental surface thereon.

DESCRIPTION OF THE PREFERRED EMBODIMENTS

Figure 1:
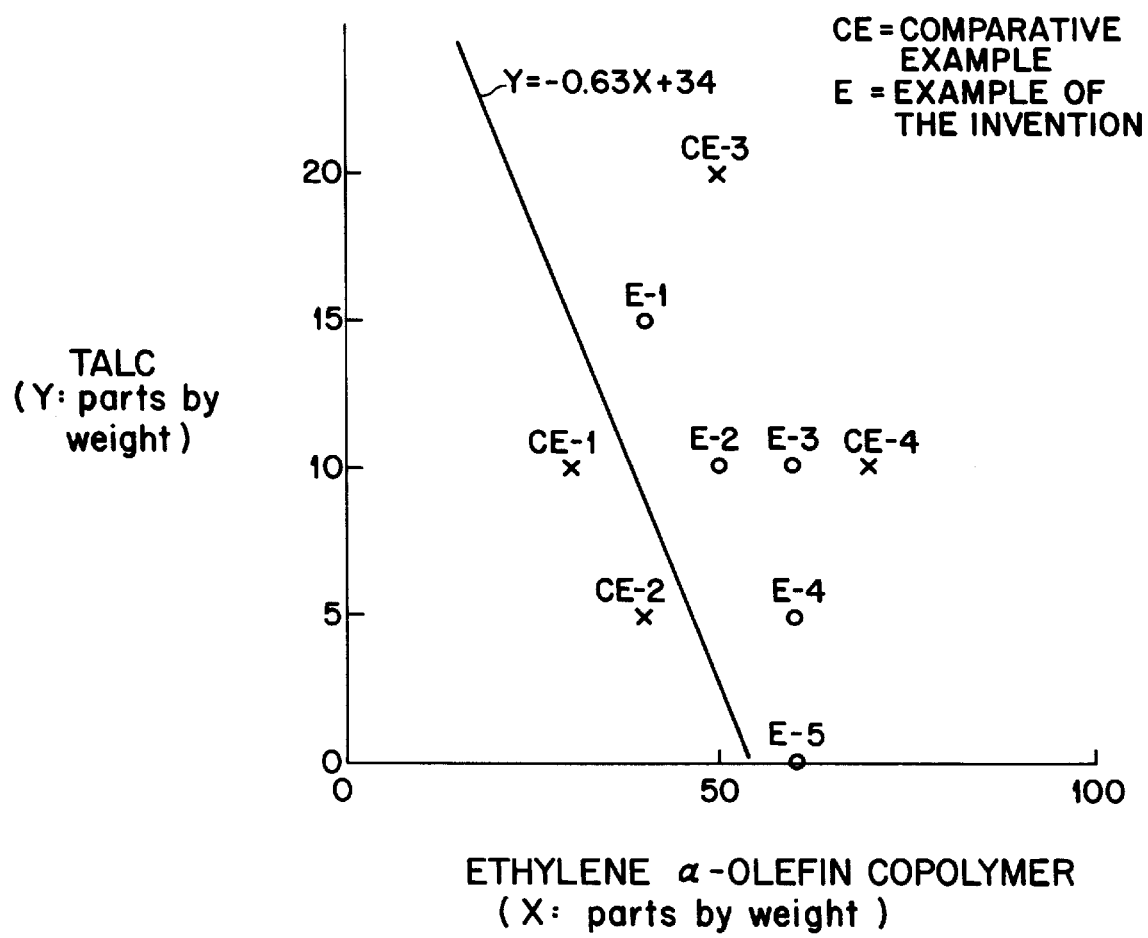
FIG. 1 is a graph representing the relationship between the amounts of talc and EOR in the composition of the first invention.

Detailed descriptions of these inventions, examples of embodiments, and comparative examples are provided hereinafter. The amounts of materials are "by weight" unless disclosed otherwise.

The composition of the first invention comprises an elastomer comprising a crystalline polypropylene (PP) and an ethylene α-olefin rubber (EOR) as base polymer. The composition further contains 0 to 15 phr of talc. The amount of talc, phr, is with respect to the amount of base polymer mixture. Consequently, "phr of talc" signifies parts per hundred weight of rubber, where rubber refers to the total base polymer mixture. When talc is present, the amount of talc can be, for example, at least 5 phr. The crystalline polypropylene does not necessarily need to be a propylene homopolymer, but may alternatively be a copolymer containing a small proportion of ethylene usually not exceeding 10%. The α-olefin in the EOR can have 3 to 12 carbon atoms, with examples including propylene, 1-butene, 1-pentene, 1-hexene, 1-heptene, 1-octene, 1-nonene, 1-decene or 4-methyl-1-pentene. If a partially or totally crosslinked copolymer is used as EOR, the copolymer may contain a very small amount of unconjugated diene, such as ethylidene norbornene, or dicyclopentadiene, as a third component. If the composition contains over 15 phr of talc, it is likely to give a molded product having an undesirably high flexural modulus and a low scratch resistance (see Comparative Example 3 below). The flexural modulus can be less than 1000 MPa, and preferably, less than 950 MPa, but greater than 300 MPa, and preferably, greater than 400 MPa. The scratch resistance, as disclosed in the examples, can be proof against car wash with a rotating nylon brush.

The crystalline polypropylene and ethylene α-olefin rubber can have a blending ratio by weight of (PP/EOR) 35/65 to 67/33. A preferred range for the blending ratio is 37/63 to 65/35. A shortage of polypropylene, or an excess of rubber results in a molded product having an outward appearance which is defective because of flow marks or an uneven surface (see Comparative Example 4), while an excess of polypropylene, or a shortage of rubber results in a molded product having flexural modulus and coefficient of linear thermal expansion which are undesirably high (see Comparative Example 1). The coefficient of linear thermal expansion can be less than $8.0 \times 10^{-5}/°C.$, and preferably, less than $7.0 \times 10^{31\ 5}/°C.$, and the lower coefficient is preferable. The possible lower coefficient is about $5 \times 10^{31\ 5}/°C.$ depending on the balance with other properties.

The crystalline polypropylene can have a Q value $(M_w/M_n) \geq 10$, and an MFR of 50 to 120. Preferred ranges for these values are $14.5 > Q \geq 12.0$ and MFR of 55 to 100. If its Q value is too low with too narrow a molecular weight distribution, and if its MFR is too low, flow marks can occur in the molded product giving it a poor outward appearance (see Comparative Example 9).

The ethylene α-olefin rubber can have an α-olefin content of 10 to 20% by weight. If its α-olefin content is too low, it is likely to become less amorphous and more crystalline and a higher coefficient of linear thermal expansion (see Comparative Examples 6 and 7). If its α-olefin content is too high, it is likely to become too amorphous and less crystalline, and the composition becomes unsatisfactory in outward appearance and scratch resistance (see Comparative Examples 5 and 8).

The talc, which usually has a shape of scale (thin plate), in general, is characterized by a range of a particle size between 1 and 15 microns. Preferably, the range of the particle size of talc is 1.5–10 microns. Preferred examples of talc include LMS 100 provided by Fuji Talc Co., Ltd. Talc can be employed with other inorganic fillers such as, for example, calcium carbonate, mica, wellastonite, barium, sulfate, clay, and whisker.

The amount X (parts by weight) of EOR in the elastomer is such that it and the amount Y (parts by weight) of talc in the composition satisfies the following relationship:

$$Y \geq -0.63X + 34.$$

The value X is defined as the relative amount by weight of EOR with respect to 100 parts by weight of base polymer mixture (comprising only EOR and polypropylene, not talc). The value Y is defined as the relative amount phr with respect to 100 parts by weight of base polymer mixture.

The presence of talc makes it possible to obtain a molded product having a low coefficient of linear thermal expansion, a good outward appearance, and a high scratch resistance, even if the elastomer may contain a relatively small amount of EOR (see Comparative Example 2 and Example 1). If the above relation fails to exist, or if the amount of EOR is too small, then a product is obtained having an undesirably high coefficient of linear thermal expansion (see Comparative Example 2).

The composition of the first invention can be used to make an elongated injection molded product, such as a side molding for an automobile, according to the second invention. Injection molding is carried out by employing a cylinder temperature of 190° C. to 240° C., a mold temperature of 20° C. to 50° C., and an injection pressure of 40 to 100 MPa. Injection molding includes also injection compression molding, sandwich injection molding and blow injection molding.

The molded product can have an embossed ornamental surface. The embossed surface generally can have an elevation of at least 3 μm, and not more than 100 μm. Not exceeding the upper limit is not essential, but is recommended from an ornamental standpoint. The preferred elevation is in the range of 20 to 60 μm. The embossed surface gives an apparently improved scratch resistance, since hardly any clearly visible scratch is formed by, for example, a brush used in a car washing job. The embossed surface is preferably formed by an embossed surface defining the cavity of the mold during injection molding, although it alternatively can be formed by, for example, a press before the product removed from the mold is cooled and hardened.

The composition of the third invention is intended for use in making an elongated injection molded product for a painted article having a flexural modulus not exceeding 1000 MPa. Products having a flexural modulus exceeding 1000 MPa are generally difficult to adapt to the curved surface of a streamlined automobile body. More specifically, any such overly rigid side molding usually fails to fit the curved surface snugly, which necessitates the use of a double-sided adhesive tape over an undesirably large area.

The composition comprises as a base polymer a thermoplastic elastomer which comprises crystalline polypropylene as a hard-phase component. As soft-phase components, ethylene propylene rubber (EPR) and ethylene $\alpha$-olefin rubber (EOR) are included. In the EOR, the $\alpha$-olefin has 4 to 12 carbon atoms and is termed limited EOR. The hard- and soft-phase components have a blending ratio (hard/soft) by weight of 48/52 to 67/33, and preferably, 53/47 to 62/38. The EPR and EOR have a blending ratio (EPR/EOR) by weight of 1/9 to 9/1, and preferably, 3/7 to 7/3. The hard/soft phase blending ratio and the EPR/EOR blending ratio are each with respect to the individual ingredients indicated and do not include other ingredients.

A shortage of the hard-phase component, or an excess of the soft-phase components, is likely to result in a molded product which is unsatisfactory in mold releasability (see Comparative Example 'g'). On the other hand, an excess of the former, or a shortage of the latter, makes it difficult to obtain a product having a flexural modulus not exceeding 1000 MPa, and a satisfactorily low coefficient of linear thermal expansion (see Comparative Example 'h'). The absence of the EPR, or the use of the limited EOR as the sole soft-phase component, results in a product which is unsatisfactory in paintability or the adhesion of a film of paint (see Comparative Example 'b'), while the use of the EPR alone is likely to result in a product which is unsatisfactory in mold releasability (see Comparative Example 'a').

The crystalline polypropylene has a Q value ($M_w/M_n$) $\geq 10$, and preferably $\geq 12$, and an MFR of 50 to 120, and preferably, 55 to 100. If its Q value is too small with too narrow a molecular weight distribution, and if its MFR is too low, flow marks are likely to form heavily on a molded product and seriously affect its outward appearance (see Comparative Example 'f'). Although a propylene homopolymer can be used as the crystalline polypropylene, it is preferable to use a copolymer containing a small amount such as 2 to 12 wt. %, and more preferably, 3 to 8 wt. % of copolymerized ethylene, since it is more compatible with EPR.

The EPR has a Mooney viscosity ($ML_{1+4}$, 100° C.) of 3 to 35, and preferably, 5 to 30. If its Mooney viscosity is too high, the composition is so affected in flowability that flow marks form heavily on a molded product and affect its outward appearance (see Comparative Example 'c'). If its Mooney viscosity is below 3, the resultant molded product is low in mold releasability and paintability.

While an ethylene-propylene copolymer (EPM) is usually used as EPR, it is possible to use an ethylene-propylene-diene terpolymer (EPDM) containing a very small amount of unconjugated diene, such as ethylidene norbornene or dicyclopentadiene, as a third component, if it is desirable to use a partially or totally crosslinked EPR.

Although the propylene content of EPR is not specifically limited, it is usual to use EPR having a propylene content of 18 to 45 wt. %, and preferably, 20 to 30 wt. %.

The limited EOR has a specific gravity not exceeding 0.892, and is preferably in the range of 0.870 to 0.892, and is more preferably in the range of 0.880 to 0.890. If it has too high a specific gravity, it is difficult to obtain a molded product which is satisfactory in paintability (see Comparative Examples "d" and "e"). Possibly, a too high a level of crystallinity may be responsible for the problem, although no definite cause is known as yet. The present inventions are not limited by theory.

The limited EOR contains a copolymerized $\alpha$-olefin having 4 to 12 carbon atoms, such as, for example, 1-butene, 1-pentene, 1-hexene, 1-heptene, 1-octene, 1-nonene, 1-decene, or 4-methyl-1-pentene. If it is desirable to use a partially or totally crosslinked EOR, it is possible to use one containing a very small amount of unconjugated diene, such as ethylidene norbornene or dicyclopentadiene, as a third component.

The EOR can have an $\alpha$-olefin content of 10 to 22 wt. %, and preferably, 12 to 20 wt. %. If its $\alpha$-olefin content is too low, the rubber is likely to become too low in amorphousness, and too high in crystallinity, and give a product having an undesirably high coefficient of linear thermal expansion. If its $\alpha$-olefin content is too high, it is likely to become too amorphous, and too low in crystallinity, and give a product which is unsatisfactory in mold releasability and outward appearance.

The composition preferably contains 5 to 20 phr, and more preferably, 8 to 15 phr of talc to ensure an improved moldability, as well as a satisfactorily low coefficient of linear thermal expansion. The amount of talc in phr is with respect to the sum of the amounts of polypropylene, EPR, and EOR polymers in the base polymer mixture. These results are difficult to expect from any composition having a talc content below 5 phr, and a product having a flexural modulus not exceeding 1000 MPa is difficult to mold from any composition having a talc content above 20 phr.

The composition of the third invention is used to make, for example, an elongated injection molded product for a painted side molding according to the fourth invention. Its injection molding is carried out by employing a cylinder temperature of 190° C. to 240° C., a mold temperature of 20° C. to 50° C., and an injection pressure of 40 to 100 MPa.

The molded product has an ornamental surface coated with, for example, a urethane paint which gives high levels of weatherability and scratch resistance. The paint usually forms a coating having a thickness of 15 to 80 $\mu$m. A primer is usually applied before a finish coating is formed. A coating having a thickness of 40 to 60 $\mu$m is preferably formed on a side molding for an automobile so as not to peel off easily as a result of, for example, the repeated collision of a door against it.

Compositions in the present inventions are prepared by mixing the ingredients according to convention processes. Other ingredients known in the art such as, for example, colorants and processing aids may be included.

Molding compositions showing a desirable balance of properties are disclosed in Japanese patent applications Nos. Hei 7-185973 filed Jul. 21, 1995 and Hei 7-274403 filed Oct. 23, 1995, the complete disclosure of which is hereby incorporated by reference.

EXAMPLES

Non-limiting examples of the present inventions as described above are now provided as well as comparative examples which further distinguish the inventions over the prior art.

A. First and Second Inventions:

(1) The compositions shown in Tables 1 and 2 were each employed to form sample materials by mixing the ingredients under conditions characterized by mixing with a Henschel mixer at room temperatures and pelletizing with a twin screw extruder at 220° C. The compositions were formed into test pieces by injection molding under either of the following conditions:

| Molding conditons A: | |
|---|---|
| Cylinder temperature, | 220° C. |
| Mold temperature, | 30° C. |
| Injection pressure, | 50 MPa |
| Molding conditions B: | |
| Cylinder temperature, | 220° C. |
| Mold temperature, | 30° C. |
| Injection pressure, | 70 MPa |

With molding condition B, on one side of each sample, an embossed surface having an elevation of 35 μm was formed during injection molding.

In Tables 1 and 2, "PP" means polypropylene and "R" means ethylene-α-olefin rubber.

(2) The following is a description of tests conducted on the sample materials after molding:
(a) Flexural modulus:
An ASTM-D790 test was conducted at a temperature of 23° C. to bend at a rate of 2 mm per minute each testpiece prepared under molding conditions A and having a width of 12.6 mm, thickness of 6.4 mm, and span length of 100 mm.
(b) Coefficient of linear thermal expansion:
A testpiece measuring 3 mm square and 10 mm long was cut from, and along the length of, the mid-portion of a JIS #1 dumbbell formed under molding conditions A, and was examined for its dimensional change in a temperature range of −10° C. to 80° C. by a thermal stress-strain measuring instrument Model SSC5000 supplied by Seiko Electronics Co.
(c) Outward appearance:
The outward appearance of each sample material having a width of 50 mm, length of 1200 mm, and thickness of 2.5 mm formed under molding conditions B was visually inspected for anything abnormal such as, for example, flow marks or other surface unevenness. The results were classified under one of four grades:
 Grade 1—Nothing abnormal was found;
 Grade 2—Hardly anything abnormal was found;
 Grade 3—Something abnormal was found; and
 Grade 4—Many abnormal features were found.
(d) Scratch resistance (outward appearance after car wash tests):
A nylon car-wash brush rotating at a speed of 200 rpm was rubbed against the embossed surface of each 5 cm square testpiece formed under molding conditions B, while water was sprinkled thereon at a rate of four liters per minute. The testpiece surface was uniformly coated with dust of Kanto loam #8, which is produced from loam layer of the Kanto region in Japan, after every 25 cycles of test each consisting of 10 seconds of rotation and one second of rest, and a total of 200 cycles of test were conducted. Then, the outward appearance of each testpiece was visually inspected for scratches. The results were classified under one of four grades:
 Grade 1—No scratch was found;
 Grade 2—Hardly any scratch was found;
 Grade 3—Some scratches were found; and
 Grade 4—Many scratches were found.
(3) The results of these tests are shown in Tables 1 and 2. The molded products according to the Examples of this invention showed a good balance of flexural modulus, coefficient of linear thermal expansion, outward appearance and scratch resistance and, above all, between coefficient of linear thermal expansion and scratch resistance. None of the molded products of the compositions according to the Comparative Examples showed a good balance of these properties.

B. Third and Fourth Inventions:
(1) The compositions as shown in Tables 3 and 4 were each employed to form sample materials by injection molding under either of the conditions A and B as stated before. Details of the components are shown in Tables 5 to 7.
(2) The following is a description of tests conducted on the sample materials:
(a) Flexural modulus: See above.
(b) Coefficient of linear thermal expansion: See above.
(c) Moldability (mold releasability):
A side molding having a thickness of 2.8 mm, width of 65 mm, and length of 1200 mm and having an ornamental surface with a mirror finish was made by a vertical injection molding machine under molding conditions B, and each molded product was examined for mold releasability when it was pushed up from the mold cavity by ejector pins. The results were classified as "o" or "x" as follows:
 o: The molded product could be released from the mold, smoothly without being deformed; or
 x: The molded product showed a great deal of resistance to its release by, for example, adhering to the mold surface, and was deformed.
(d) Outward appearance:
The outward appearance of each side molding as obtained in (c) above was visually inspected for anything abnormal such as, for example, flow marks or any other surface unevenness. The results were classified under "o" or "x" as follows:
 o: Nothing abnormal was found; or
 x: Something abnormal was found.
(e) Paint adhesion:
Each side molding was cleansed with isopropyl alcohol, coated with a chlorinated polypropylene primer, and given a finish coat of an acrylurethane paint, followed by 30 minutes at 100° C. of baking and drying. A crosscut test conforming to the conditions of JIS K 5400 was conducted to examine each testpiece for its initial paint adhesion and for its paint adhesion after a hot water test lasting for 10 days at 40° C. The crosscut test was conducted by cutting 100 squares and counting the squares for which the paint peeled. The results are shown as, for example, 60/100 indicating that the paint peeled off 60 of the 100 squares. The testpiece was considered as standing the test only when none of the 100 squares exhibited paint peeling off (0/100). After the hot water test, each testpiece was also subjected to visual inspection for blisters or other defects.
(3) The results of the tests are shown in Tables 3 and 4. The molded products according to the Examples of this invention showed a good balance between their flexural modulus, coefficient of linear thermal expansion, outward appearance, and paint adhesion, and particularly, between flexural modulus and scratch resistance. In contrast, the molded products of the compositions according to the Comparative Examples failed to show a good balance between these properties.

While the invention has been described in detail and with reference to specific embodiments thereof, it will be apparent to those of ordinary skill in the art that various changes and modifications can be made therein without departing from the spirit and scope thereof.

TABLE 1

| | CE-1 | CE-2 | E-1 | E-2 | CE-3 | E-3 | E-4 | E-5 | (Parts by weight) CE-4 |
|---|---|---|---|---|---|---|---|---|---|
| PP-1 (Q:13.0, MFR:60) | 70 | 60 | 60 | 50 | 50 | 40 | 40 | 40 | 30 |
| R-1 (Propylene:15%) | | | | | | | | | |
| R-2 (Propylene:25%) | | | | | | | | | |
| R-3 (1-Butene:8%) | | | | | | | | | |
| R-4 (1-Butene:15%) | 30 | 40 | 40 | 50 | 50 | 60 | 60 | 60 | 70 |
| R-5 (1-Butene:20%) | | | | | | | | | |
| R-6 (1-Octene:7.5%) | | | | | | | | | |
| R-7 (1-Octene:14.5%) | | | | | | | | | |
| R-8 (1-Octene:24%) | | | | | | | | | |
| Talc, Fuji Talc Co., Ltd. | 10 | 5 | 15 | 10 | 20 | 10 | 5 | 0 | 10 |
| flexural modulus (MPa) | 1400 | 730 | 920 | 830 | 1060 | 640 | 510 | 420 | 470 |
| Coefficient of linear thermal expansion ($\times 10^{-5}/°C$.) | 9.0 | 6.6 | 7.8 | 7.1 | 6.1 | 5.9 | 6.5 | 7.0 | 6.9 |
| Outward appearance | 1 | 1 | 1 | 1 | 1 | 1 | 1 | 2 | 3 |
| Outward appearance after car wash test (embossed surface) | 1 | 1 | 2 | 1 | 3 | 2 | 1 | 1 | 4 |

CE = Comparative Example
E = Example of the Invention
R = EOR

TABLE 2

| | E-6 | CE-5 | CE-6 | E-7 | CE-7 | E-8 | CE-8 | (Parts by weight) CE-9 | E-9 |
|---|---|---|---|---|---|---|---|---|---|
| PP-1 (Q:13.0, MFR:60) | 50 | 50 | 50 | 50 | 50 | 50 | 50 | *1 | *2 |
| R-1 (Propylene:15%) | 50 | | | | | | | | |
| R-2 (Propylene:25%) | | 50 | | | | | | | |
| R-3 (1-Butene:8%) | | | 50 | | | | | | |
| R-4 (1-Butene:15%) | | | | | | | | 50 | 50 |
| R-5 (1-Butene:20%) | | | | 50 | | | | | |
| R-6 (1-Octene:7.5%) | | | | | 50 | | | | |
| R-7 (1-Octene:14.5%) | | | | | | 50 | | | |
| R-8 (1-Octene:24%) | | | | | | | 50 | | |
| Talc, Fuji Talc Co., Ltd. | 10 | 10 | 10 | 10 | 10 | 10 | 10 | 10 | 10 |
| flexural modulus (MPa) | 780 | 710 | 980 | 760 | 950 | 820 | 730 | 790 | 810 |
| Coefficient of linear thermal expansion ($\times 10^{-5}/°C$.) | 6.8 | 6.4 | 8.7 | 6.7 | 6.5 | 7.2 | 6.6 | 7.0 | 7.0 |
| Outward appearance | 1 | 3 | 1 | 2 | 1 | 1 | 3 | 4 | 1 |
| Outward appearance after car wash test (embossed surface) | 2 | 4 | 1 | 2 | 1 | 1 | 4 | 1 | 1 |

*1) PP-2 (Q:8.6,MFR:45):50
*2) PP-3 (Q14.8,MFR:80):50

TABLE 3

| | | CE-a | E-a | E-b | E-c | CE-b | E-d | CE-c | CE-d | E-e |
|---|---|---|---|---|---|---|---|---|---|---|
| PR | 1 | 55 | 55 | 55 | 55 | 55 | 55 | 55 | 55 | 55 |
| | 2 | | | | | | | | | |
| | 3 | | | | | | | | | |
| EPR | 1 | 45 | 30 | 22.5 | 15 | | | 22.5 | 22.5 | 22.5 |
| | 2 | | | | | | 22.5 | | | |
| | 3 | | | | | | | 22.5 | | |
| EOR | 1 | | 15 | 22.5 | 30 | 45 | 22.5 | 22.5 | | |
| | 2 | | | | | | | | 22.5 | |
| | 3 | | | | | | | | | 22.5 |
| | 4 | | | | | | | | | |
| Talc. | | 10 | 10 | 10 | 10 | 10 | 10 | 10 | 10 | 10 |
| MFR (g/10 min.) | | 24 | 22 | 22 | 21 | 20 | 19 | 16 | 22 | 17 |
| flexural modulus (MPa) | | 740 | 780 | 820 | 840 | 880 | 770 | 760 | 830 | 800 |
| Coefficient of linear thermal expansion ($\times 10^{-5}/°C$.) | | 4.8 | 5.1 | 5.4 | 5.6 | 5.9 | 5.1 | 5.2 | 5.8 | 5.3 |
| Mold releasability | | x | o | o | o | o | o | o | o | o |
| Outward appearance | | x | o | o | o | o | o | x | o | o |
| Paint adhesion (initial) | | — | 0/100 | 0/100 | 0/100 | x | 0/100 | — | x | 0/100 |
| Paint adhesion (after hot water test) | | — | 0/100 | 0/100 | 0/100 | — | 0/100 | — | — | 0/100 |

TABLE 4

|  | CE-e | E-f | CE-f | CE-g | E-g | CE-h | E-h |
|---|---|---|---|---|---|---|---|
| PR 1 | 55 |  |  | 45 | 60 | 70 | 55 |
| 2 |  | 55 |  |  |  |  |  |
| 3 |  |  | 55 |  |  |  |  |
| EPR 1 | 22.5 | 22.5 | 22.5 | 27.5 | 20 | 15 | 22.5 |
| 2 |  |  |  |  |  |  |  |
| 3 |  |  |  |  |  |  |  |
| EOR 1 |  | 22.5 | 22.5 | 27.5 | 20 | 15 | 22.5 |
| 2 |  |  |  |  |  |  |  |
| 3 |  |  |  |  |  |  |  |
| 4 | 22.5 |  |  |  |  |  |  |
| Talc, Fuji Talc Co., Ltd. | 10 | 10 | 10 | 10 | 10 | 10 | 0 |
| MFR (g/10 min.) | 18 | 24 | 18 | 15 | 25 | 28 | 23 |
| flexural modulus (MPa) | 850 | 770 | 760 | 590 | 920 | 1150 | 670 |
| Coefficient of linear thermal expansion ($\times 10^{-5}/°C.$) | 6.3 | 5.2 | 5.0 | 5.0 | 5.8 | 6.7 | 6.0 |
| Mold releasability | o | o | o | x | o | o | o |
| Outward appearance | o | o | x | x | o | o | o |
| Paint adhesion (initial) | x | 0/100 | — | — | 0/100 | 0/100 | 0/100 |
| Paint adhesion (after hot water test) | — | 0/100 | — | — | 0/100 | 0/100 | 0/100 |

TABLE 5

|  | PP 1[1] | PP 2[2] | PP 3[1] |
|---|---|---|---|
| Q value by GPC | 13 | 14.8 | 8.6 |
| MFR | 60 | 80 | 45 |
| Ethylene (wt. %) | 4.4 | 5.3 | 10.6 |

TABLE 6

|  | EPR1[3] | EPR2[3] | EPR3[3] |
|---|---|---|---|
| Propylene (wt %) | 23 | 26 | 27 |
| Mooney viscosity, $ML_{1+4}$ (100) | 10 | 24 | 42 |
| Specific gravity | 0.87 | 0.86 | 0.86 |
| Hardness (JIS A) | 59 | 55 | 55 |
| MFR, 230° C. (g/10 min.) | 8.1 | 3.2 | 1.2 |

TABLE 7

|  | EOR1[4] | EOR2[4] | EOR3[5] | EOR4[5] |
|---|---|---|---|---|
| α-olefin | Butene | Butene | Octene | Octene |
| α-olefin (wt. %) | 16 | 15 | 18 | 14 |
| Specific gravity | 0.887 | 0.893 | 0.885 | 0.895 |
| Hardness (JIS A) | 83 | 88 | 86 | 90 |
| MFR, 230° C. (g/10 min.) | 6.5 | 6.0 | 5.0 | 4.0 |

[1] Misubishi Chemical Co., Ltd.
[2] Tounen Chemical Co., Ltd.
[3] Mitsui Petrochemical Co., Ltd.
[4] Mitsui Petroleum Chemical Co., Ltd.
[5] Dow Chemical Co.

What is claimed is:

1. A composition comprising the following ingredients:
    (a) a crystalline polypropylene having an $M_w/M_n$ value $Q \geq 10$ and a melt flow rate between 50 and 120,
    (b) an ethylene-α-olefin rubber having an α-olefin content between 10 wt. % and 20 wt. %, wherein the amounts by weight of said crystalline polypropylene and said ethylene-α-olefin rubber are characterized by a blending ratio with respect to each other between 35/65 and 67/33,
    (c) 0–15 phr (parts per hundred weight of rubber) talc, wherein the amount phr by weight of said talc is with respect to the sum of the amounts of said crystalline polypropylene and said ethylene-α-olefin rubber, and the phr amount by weight of said talc, Y, and the amount by weight of said ethylene-α-olefin rubber in said blending ratio, X, is characterized by:

$$Y \geq -0.63X + 34$$

wherein $0 \leq Y \leq 15$.

2. A product prepared by injection molding a composition according to claim 1 in an elongated mold, said product having an embossed ornamental surface.

3. A product according to claim 2, wherein said embossed ornamental surface has an elevation of at least 3 microns.

4. A product according to claim 3, wherein said embossed ornamental surface has an elevation between 20 microns and 60 microns.

5. A composition comprising the following ingredients:
    (a) a crystalline polypropylene which forms a hard-phase in said composition and has an $M_w/M_n$ value $Q \geq 10$ and a melt flow rate between 50 and 120,
    (b) an ethylene propylene rubber having a Mooney viscosity between 3 and 35 $ML_{1+4}$ at 100° C., and
    (c) an ethylene-α-olefin rubber containing a $C_4$–$C_{12}$ α-olefin and having a specific gravity of at most 0.892, said ethylene propylene rubber and said ethylene-α-olefin rubber forming a soft-phase in said composition and characterized by a blending ratio by weight between 1/9 and 9/1, wherein said hard-phase of crystalline polypropylene and said soft-phase of ethylene propylene rubber and ethylene-α-olefin rubber are characterized by a blending ratio by weight between 48/52 and 67/33.

6. A composition according to claim 5 further comprising talc in an amount between 5 and 20 phr (parts per hundred weight of rubber).

7. A composition comprising the following ingredients:
    (a) a crystalline polypropylene copolymer forming a hard-phase in said composition and having an $M_w/M_n$ value $Q \geq 10$, having a melt flow rate between 50 and 120, and containing between 2 and 12 wt. % copolymerized ethylene,
    (b) an ethylene propylene rubber having a Mooney viscosity between 3 and 35 $ML_{1+4}$ at 100° C. and a propylene content between 20 and 45 wt. %, and (c) an ethylene-α-olefin rubber containing a $C_4$–$C_{12}$ α-olefin content between 10 and 22 wt. %, and having a specific gravity between 0.870 and 0.892, said ethylene propylene rubber and said ethylene-α-olefin rubber forming a soft-phase in said composition and characterized by a blending ratio by weight between 1/9 and 9/1, wherein said hard-phase of crystalline polypropylene copolymer and said soft-phase of ethylene propylene rubber and ethylene-α-olefin rubber are characterized by a blending ratio between 48/52 and 67/33.

8. A composition according to claim 7 further comprising talc in an amount between 5 and 20 phr (parts per hundred weight of rubber).

9. A product formed by injection molding a composition according to claim 5 and having at least one painted ornamental surface.

10. A product according to claim 9, wherein said product is formed by injection molding a composition according to claim 5.

11. A product according to claim 9, wherein said product is formed by injection molding a composition according to claim 7.

12. A product according to claim 1, wherein said talc is present in present in said composition.

13. An injection molded product formed from said composition of claim 1.

14. An injection molded product formed from said composition of claim 5.

15. An injection molded product formed from said composition of claim 7.

16. A composition according to claim 1, wherein said talc has a particle size in the range of 1–15 microns.

17. A composition according to claim 16, wherein said talc has a particle size in the range of 1.5–10 microns.

18. A product formed by injection molding a composition according to claim 7 and having at least one painted ornamental surface.

* * * * *